(12) United States Patent
Mazur et al.

(10) Patent No.: US 6,495,013 B2
(45) Date of Patent: Dec. 17, 2002

(54) BIPOLAR MEMBRANE ELECTRODIALYSIS OF MULTIVALENT METAL SALTS WHOSE CORRESPONDING BASE IS INSOLUBLE

(75) Inventors: Duane J. Mazur, Amherst, NY (US); J. David Genders, Marilla, NY (US); Dan M. Hartsough, Clarence, NY (US)

(73) Assignee: The Electrosynthesis Company, Inc., Lancaster, NY (US)

( * ) Notice: Subject to any disclaimer, the term of this patent is extended or adjusted under 35 U.S.C. 154(b) by 0 days.

(21) Appl. No.: 09/901,978

(22) Filed: Jul. 10, 2001

(65) Prior Publication Data

US 2002/0005356 A1 Jan. 17, 2002

Related U.S. Application Data

(60) Provisional application No. 60/218,126, filed on Jul. 13, 2000.

(51) Int. Cl.$^7$ ............................................... B01D 61/44
(52) U.S. Cl. ........................ 204/525; 204/534; 204/537; 204/538
(58) Field of Search ................................ 204/534, 525, 204/537, 538

(56) References Cited

U.S. PATENT DOCUMENTS

| | | | |
|---|---|---|---|
| 4,636,289 A | 1/1987 | Mani et al. | 204/182.4 |
| 4,999,095 A | 3/1991 | Chlanda et al. | 204/182.4 |
| 5,194,130 A | * 3/1993 | Byszewski et al. | 204/539 |
| 5,281,318 A | 1/1994 | Tahara | 204/182.4 |
| 6,187,570 B1 | 2/2001 | Genders et al. | 435/137 |

OTHER PUBLICATIONS

Bipolar Membrane Water Splitting to Produce Orgainc Acids by Eli Salem, Daniel Bar, Boris Hersonski, C.H. Byszewski, Y.C. Chiao Aqualytics, pp. 1–8 Nov. 1997.

* cited by examiner

Primary Examiner—Arun S. Phasge
(74) Attorney, Agent, or Firm—Howard M. Ellis

(57) ABSTRACT

Bipolar membrane electrodialysis methods for salt splitting polyvalent metal salts, where the metal cation can form substantially insoluble precipitates in the presence of hydroxyl ions can now be used in recovering acid and base values from a salt streams without precipitates fouling cell operation and causing shutdown. The introduction of an acid to the chamber where metal hydroxides would form inhibits their development or neutralizes formed solids, allowing salt splitting to continue. Salt splitting methods of the invention performed with a three compartment bipolar electrodialysis cell are useful in producing concentrated and purified acid forms, such as 2-keto-L-gluconic acid, H(KLG), a key intermediate in the production of ascorbic acid.

20 Claims, 2 Drawing Sheets

C = cation exchange membrane
BP = Bipolar Membrane

BIPOLAR MEMBRANE ELECTRODIALYSIS OF MULTIVALENT METAL SALTS WHOSE CORRESPONDING BASE IS INSOLUBLE

CROSS REFERENCE TO RELATED APPLICATION

This application claims the benefit of U.S. Provisional Application Ser. No. 60/218,126, filed Jul. 13, 2000.

GOVERNMENT LICENSE RIGHTS

This invention was made with United States Government support under Cooperative Research Agreement No. 70NANB5H1138 awarded by the Advanced Technology Program of the National Institute of Standards and Technology. The United States Government has certain rights in the invention.

TECHNICAL FIELD

This invention relates generally to salt splitting methods, and more specifically, to improved methods for salt splitting by means of bipolar membrane electrodialysis where the salts possess cations having the potential of forming substantially insoluble precipitates, e.g., metal hydroxides, oxides, and so on.

BACKGROUND OF THE INVENTION

Salt splitting electrodialysis is a useful technique for recovering acid and base values from salt streams.

Electrodialysis methods performed with bipolar membranes have been used where the cation is monovalent and does not form an insoluble base (, e.g., lithium, sodium, potassium and ammonium). Salt splitting methods using electrodialysis with bipolar membranes traditionally have not been carried out in the presence of polyvalent metal salts because metal hydroxides formed are so insoluble they precipitate in the electrodialysis chamber, or in or on the cation or bipolar membranes, fouling the membranes or electrodialysis stacks resulting in blockage and eventual shutdown. The formation of insoluble metal hydroxides within the cation or bipolar membranes will also lead to higher voltage drops, and eventually physical damage to the membranes. One report published by Aqualytics (Salem, Eli et al., "Bipolar Membrane Water Splitting to Produce Organic Acids", presented at The 11th. International Forum on Electrolysis in the Chemical Industry, Clearwater Beach, FL (Nov. 2–6, 1997), a manufacturer of membranes and electrodialysis equipment with bipolar membranes, suggests treatment with chelating ion exchange resins to remove polyvalent metals to <1 ppm before employing electrodialysis with bipolar membranes.

This limitation in the use of salt splitting electrodialysis with bipolar membranes has been found to be particularly problematic in the production of ascorbic acid intermediates by glucose fermentation. In this process, fermentation converts glucose to a 2-keto-L-gluconic (also referred to as "KLG") acid salt, a useful intermediate in the production of ascorbic acid. KLG acid salt, however, must first be converted to the free acid form before chemical conversion to ascorbic acid can occur. The problem is, that free KLG acid is a fairly strong organic acid (pKa=2.7). Solutions of KLG acid were found to be too acidic for fermentation to proceed. Consequently, a suitable base needs to be added to the fermenter to maintain a near neutral pH, and form a salt of KLG. In the case of bacterium used to form KLG from glucose, the most suitable base has been divalent calcium hydroxide. By contrast, KLG productivity, yield, titer and cell viability are all significantly reduced when monovalent bases, such as sodium, potassium or ammonium hydroxides are used to control pH during fermentation.

Therefore, the preferred fermentation product has been calcium KLG, $Ca(KLG)_2$. The conventional approach to acidification of calcium KLG has been to add sulfuric acid to equivalence to form KLG acid (HKLG) and calcium sulfate. Because calcium sulfate is only sparingly soluble it needs to be filtered off. Residual soluble calcium sulfate is removed by cation and anion exchange steps. While effective, this process generates large quantities of calcium sulfate waste that must be landfilled at considerable cost. It also entails a relatively high capital cost due to the need for cation and anion exchange and evaporation steps to remove large amounts of water from a relatively dilute fermentation broth.

Accordingly, there is a need for an improved more economic method for splitting polyvalent metal salts by electrodialysis technique which permits employing bipolar membranes wherein the formation of unwanted precipitates and the disposal problems associated therewith are avoided, as are the problems of fouling electrodialysis cell membranes, and a reduction in costly downtime.

SUMMARY OF THE INVENTION

It is therefore a principal object of the invention to provide novel and improved methods for splitting salts which avoid or reduce the problems associated with insoluble precipitates forming and downtime when performed using bipolar membrane electrodialysis. With the improved methods of the invention, it is now possible to employ electrodialysis techniques with bipolar membranes in splitting salts having polyvalent cations without the added disposal problems associated with solid by-products. These inventors found that the introduction of inexpensive, readily available acid to the chamber where insoluble hydroxide precipitates would otherwise form, the development and accumulation of such unwanted solids is avoided or inhibited. Instead of unwanted precipitates forming, useful acid and base values are produced without solids impeding cell operations.

In meeting the above principal object, a method is provided for inhibiting the formation of precipitates, such as polyvalent metal hydroxides in splitting salts by means of bipolar membrane electrodialysis by the steps, which comprise:

(i) providing an aqueous solution of a salt particularly one having a polyvalent inorganic cation and an organic anion;

(ii) separating the polyvalent inorganic cation from the aqueous solution by transporting across a cation exchange membrane into a base compartment, and (iii) neutralizing insoluble polyvalent metal hydroxide formed from hydroxyl groups supplied across a bipolar membrane by introducing to the base compartment an acid to form a soluble polyvalent salt product with the polyvalent inorganic cation.

The introduction of an acid into the base compartment of an electrodialysis cell where insoluble hydroxides form neutralizes the hydroxide, or inhibits the formation of a solid precipitate.

It is yet a further object of the invention to provide a method for splitting salts by means of bipolar membrane electrodialysis which generates and concentrates multiple useful products, which comprises the steps of:

(i) providing an aqueous solution of a salt comprising cations and anions;

(ii) separating the cations from the aqueous solution by transporting across a cation exchange membrane;

(iii) converting the separated cations into the corresponding hydroxide by the introduction of hydroxyl groups supplied across a bipolar membrane;

(iv) forming a first useful product by acidifying the hydroxide;

(v) forming a second useful product either by:

(a) acidifying the anions remaining in the aqueous solution after separating the cations therefrom (step ii) by the addition of protons supplied across a bipolar membrane to form the corresponding free acid of the anion, or (b) by separating the anions from the aqueous solution by transporting through an anion exchange membrane, and converting the separated anions to the corresponding free acid by the addition of protons supplied across a bipolar membrane.

The salt splitting electrodialysis methods of the invention are useful in recycle applications, such as in the recovery of organic acids from fermentation broths, like HKLG, or where the desired acid is present as a weak salt, e.g., calcium lactate. In the case of the latter, lactic acid may be recovered from calcium lactate by the salt splitting methods of this invention employing bipolar membrane electrodialysis. The introduction of acid from an external source according to the improved methods disclosed herein avoids insoluble metal hydroxide precipitates from accumulating and fouling the cell stack. It is the bipolar membranes in the cell stacks which dissociate water to form hydroxyl ions and protons on opposing sides of the membrane at low potential The electrodialysis methods with bipolar membranes according to the invention may be conducted in multi-compartment cells having at least two compartments. In most instances, salt splitting is performed in electrodialysis cells have two and three compartment configurations. Typically, two compartment bipolar membrane electrodialysis methods are employed when salt splitting forms a weak acid or weak base. The bipolar membrane is paired with a cation exchange membrane when a weak acid is formed, or an anion exchange membrane when a weak base is formed. Because the weak acid or base formed is sufficiently undissociated it is not transported across ion exchange membranes to any great extent. Thus, in lactic acid production, calcium lactate is passed through the diluate compartment of a two compartment electrodialysis cell fitted with bipolar membranes and cation exchange membrane. Calcium ions are transported across the cation exchange membrane to a base compartment where calcium hydroxide formed from hydroxyl ions from the bipolar membrane is acidified by the introduction of acid to neutralize any metal hydroxides. Lactate remaining in the diluate compartment is acidified by protons from the bipolar membrane. The lactic acid thus formed is a weak acid and does not undergo electromigration.

The present invention also contemplates the use of three compartment electrodialysis cells with bipolar membranes. They are especially useful when splitting a strong acid and a base. The diluate stream with salt present is disposed between a base compartment and an acid compartment. The base compartment is separated from the diluate compartment by a cation exchange membrane, and the acid compartment separated from the diluate compartment by an anion exchange membrane. These three compartment units are bounded on the ends by bipolar membranes, which supply hydroxide ions to the base compartment and protons to the acid compartment. Thus, a three compartment bipolar membrane electrodialysis stack consists of at least one of these three compartment units disposed between an anode and a cathode.

During calcium KLG salt splitting, for instance, the calcium migrates from the diluate compartment to the base compartment to react with hydroxyl groups supplied by the bipolar membrane. Instead of forming insoluble precipitate, acid introduced into the base compartment neutralizes the hydroxide to form a soluble salt of the neutralizing acid. Simultaneously, KLG anion from the diluate is transported across the anion exchange membrane to the acid compartment where protons supplied by the bipolar membrane provide the desired KLG free acid for conversion into ascorbic acid.

DESCRIPTION OF THE PREFERRED EMBODIMENTS

While bipolar membrane electrodialysis methods of the invention will be described within the framework of recovering a specific organic acid and polyvalent metal salts from fermentation broths and less valuable starting polyvalent metal salts, it is to be understood the inventive concepts disclosed herein are applicable to a much broader range of substrates, namely salt splitting virtually any polyvalent metal salt where the metal cation forms substantially insoluble precipitates (e.g., hydroxides and oxides) in the presence of hydroxide ion.

Accordingly, salt splitting methods of this invention employing bipolar membrane electrodialysis relates to the treatment of aqueous solutions comprising metal salts whose corresponding base is insoluble, and more specifically, splitting polyvalent metal salts comprising such representative polyvalent metals as $Ca^{+2}$, $Mg^{+2}$, $Al^{+3}$, $Ti^{+3}$ and mixtures thereof. Likewise, other representative metal salts which may be treated are those derived from fermentation processes, and especially acid salts containing, for example, KLG, e.g., $Ca(KLG)_2$, which needs to be converted and concentrated into the free acid as a useful intermediate prior to conversion to ascorbic acid.

Figure 1:
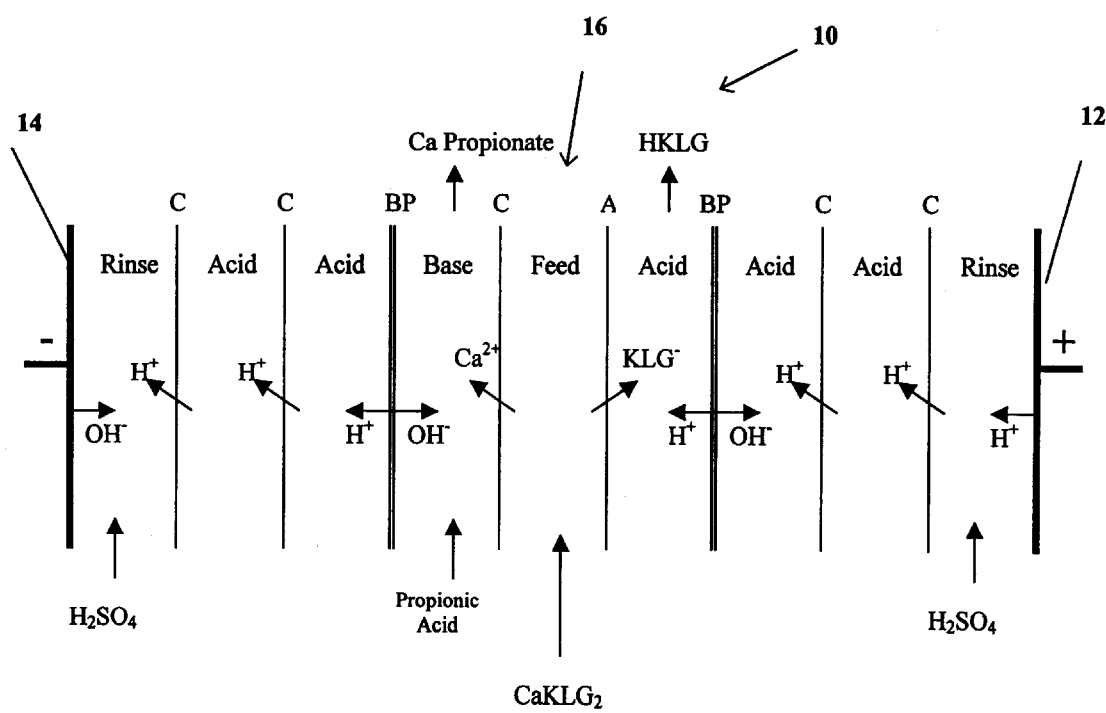
FIG. 1 is a diagrammatic view of a three compartment electrodialysis cell with bipolar membranes used for salt splitting a polyvalent metal cation salt, such as $Ca(KLG)_2$ which forms a strong acid, HKLG.

Turning first to FIG. 1, there is illustrated a three compartment electrodialysis cell 10, equipped with an anode 12, cathode 14 and a single three compartment unit 16 consisting of a central diluate feed compartment; an acid compartment right of the feed compartment separated by an anion exchange membrane, and a base compartment left of the feed compartment separated by a cation exchange membrane. The three compartment unit 16 is bounded on each end by a bipolar membrane which supplies hydroxyl ions to the base compartment and protons to the acid compartment.

Thus, the three compartment bipolar membrane electrodialysis stack will consist of at least one of the above three compartment units disposed between an anode and cathode. Bipolar membranes consist of an anion exchange layer bonded to a cation exchange layer. A representative example of a useful bipolar membrane is that sold under the trademark Neosepta® BP-1, available from Tokuyama Corporation. Bipolar membranes dissociate water to form both hydroxide ions and protons at low potential.

The anion exchange membranes may be strongly, mildly or weakly basic, and are comprised of quaternary or tertiary ammonium groups. The anion exchange membranes should be stable, have a low resistance to the anion being transported and prevent the transport of neutral sugars, i.e., substantially non-ionized molecules.

The cation exchange membranes should be stable, and have a low resistance in the polyvalent metal salt solution to be dialyzed. Cation exchange membranes can include perfluorinated type membranes, such as DuPont's Nafion®, or any of the non-perfluorinated cation exchange membranes, such as Neosepta CMX-SB, also available from the Tokuyama Corporation. As will be understood by persons skilled in the art, several of the three compartment units comprised of bipolar membranes, cation exchange and anion exchange membranes may be grouped together in an electrodialysis stack with a single pair of electrodes at the outer ends.

The electrodes consist of an anode 12 and cathode 14. The anode should be stable to the electrolysis conditions employed, and compositionally may be comprised of carbons, such as graphite, lead dioxide, noble metals or alloys of platinum, palladium, iridium, gold, ruthenium, and the like. This includes noble metals or alloys deposited onto valve metals, like titanium, tantalum, and so on. Generally, the reaction at the anode 12 will be the oxidation of water as shown by equation (I) wherein protons and oxygen are generated:

(Anode) $2H_2O \rightarrow O_2 + 4H^+ + 4e^-$     (I)

The cathode should also be stable, and may be comprised of noble metals and their alloys; nickel, steels, and so on. Generally, the reaction at the cathode involves the reduction of water to produce hydrogen and hydroxyl groups according to equation (II):

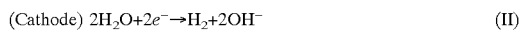

(Cathode) $2H_2O + 2e^- \rightarrow H_2 + 2OH^-$     (II)

Because polyvalent cations are present, the anolyte and catholyte streams preferably comprise solutions of inert strong acids, such as sulfuric acid or nitric acid in the rinse compartments. They help to prevent the formation of insoluble hydroxides in the electrode rinse solutions, and importantly, perform as conductivity modifiers and electrolytes during electrolysis. Preferably, in the three compartment configuration, the electrode rinse streams are tied together outside the cell (not shown), and are bounded by cation exchange membranes (FIG. 1) adjacent to acid compartments, so that only protons are transported into and out of the rinse streams, and the overall composition of the rinse stream is not altered.

In operation of the electrodialysis cell, under the influence of the potential field, water is dissociated in the bipolar membrane to form hydroxide ions and protons. The introduction of acid into the base compartment, such as propionic acid neutralizes hydroxide ions so the formation of metal hydroxide precipitates are either inhibited or when formed neutralized. In the latter case, water and a soluble metal salt of the acid added to the base compartment, such as propionic acid, are formed. Preferably, a molar excess of the neutralizing acid is maintained in the base compartment. Other representative neutralizing acids include acetic acid, hydrochloric acid, nitric acid, and so on.

Figure 2:
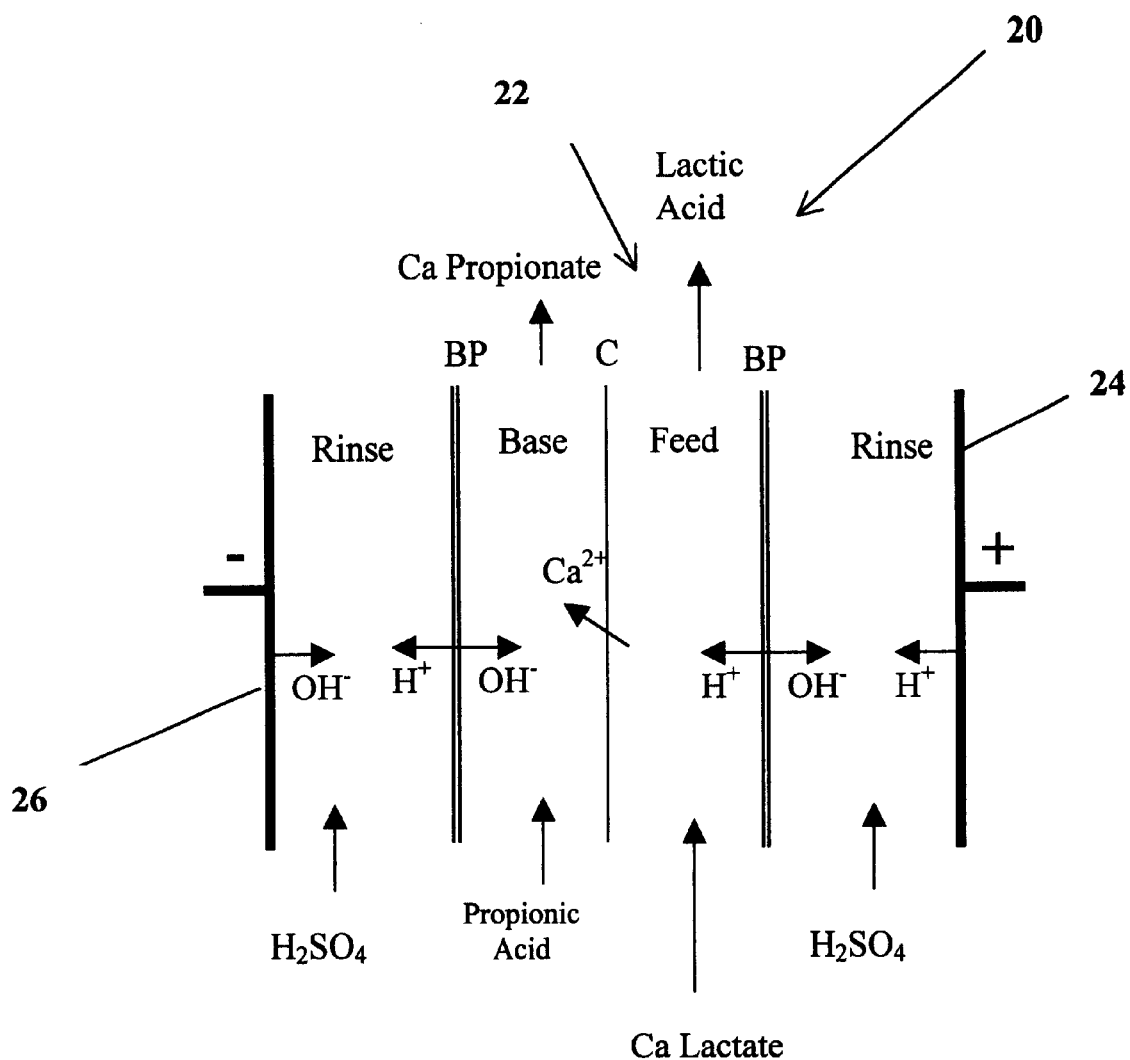
FIG. 2 is a diagrammatic view of a two compartment electrodialysis cell with bipolar membranes used for salt splitting a polyvalent metal cation salt, such as calcium lactate which forms a weak acid.

As illustrated by FIGS. 1–2, protons migrate toward the cathode into the acid compartments where they will combine with anions of polyvalent metal salts, such as KLG (FIG. 1) which have migrated from the feed compartment across the anion exchange membrane towards the anode 12 into the acid compartment. The combining of protons and anions of polyvalent metal salts in the acid compartment (FIG. 1) forms a purified and concentrated solution of the desired acid, such as HKLG. This leaves behind neutral sugars in the feed compartment nearly depleted of the valuable anions and cations. The salt splitting process with bipolar membrane electrodialysis according to the system of FIG. 1, thus provides a valuable solution of KLG acid suitable for further processing into ascorbic acid, along with secondary useful co-products, e.g., calcium propionate for recovery and sale. It will be understood, such subsequent procedures involves processes not intended as part of this invention.

FIG. 2 illustrates a representative bipolar electrodialysis stack also useful in splitting and concentrating polyvalent cation salts. That is, similar to the three compartment cell of FIG. 1, the two compartment electrodialysis cell 20 of FIG. 2 is also useful in practicing the salt splitting methods of this invention, but particularly where splitting involves, for instance, polyvalent salts of weak acids, such as calcium lactate which would otherwise form insoluble calcium hydroxide in bipolar membrane electrodialysis.

Cell 20 depicts a two compartment bipolar membrane electrodialysis stack 22 useful for splitting polyvalent cation salts which form weak acids, such as lactic acid. Like that of the three compartment cell, the two compartment electrodialysis stack comprises an anode 24 and cathode 26 rinsed by an acid electrolyte, e.g., sulfuric acid. Stack 22 consists of at least one feed compartment and at least one base compartment separated by a cation exchange membrane, previously described. The base and feed compartments are bounded on each side with bipolar membranes of similar structure to the three compartment cell of FIG. 1.

Under the influence of the potential field, water will be dissociated in the bipolar membrane to form hydroxyl ions and protons. Hydroxyl ions migrating toward the anode 24 and into the base compartment are neutralized by acid introduced into the base compartment. That is, the development of insoluble hydroxide precipitates is inhibited, or if formed from polyvalent metal ions, such as calcium transported across the cation exchange membrane toward cathode 26, are neutralized in the base compartment. Preferably, a molar excess of acid, e.g., propionic acid, etc., is maintained in the base compartment.

Simultaneously, protons will migrate towards cathode 26 and into the feed compartment where they will combine with anion, e.g., lactate and form lactic acid. Because it is a weak acid, the proton is largely undissociated, and therefore, does not compete with the metal cation for transport across the cation exchange membrane and into the base compartment. In the process, the polyvalent cation, e.g., $Ca^{+2}$, may be nearly completely depleted from the feed solution containing the anion, which is converted to a weak acid, like lactic acid. Any residual cations remaining in the acid solution may be removed by cation exchange resin or other suitable technique.

The bipolar membrane electrodialysis cells of FIGS. 1 and 2 may be operated at a unit cell voltage of from about 0.1 to 10 volts per stack of membranes, and more preferably, from about 0.5 to about 5 volts per stack of membranes. Operating temperatures should be in the range from about 5 to 100° C., and more specifically, from about 20 to about 50° C. While higher operating temperatures than those mentioned above may be suitable, they may cause degradation of some membranes.

In some instances, fugitive impurities in feed solutions may foul the membranes, resulting in a deterioration in cell performance. In some instances, poorly mixed regions of the base or feed compartment where acid is added, polyvalent metal hydroxides may precipitate out. In such an event, the cell and membranes can be cleaned in place, in the electrodialysis stack, with acid solutions, including nitric acid, hydrochloric or other mineral acids to remove any metal hydroxides. Basic wash solutions may also be employed, preferably after an acid wash to remove organic foulants from membranes. Other wash solutions, such as percarboxylic acids, non-ionic or ionic detergents, or alcohols may be used, so long as they effect the necessary membrane cleaning without degrading membrane performance. This "clean in place" procedure may be performed at elevated temperatures of wash solutions, provided the membranes are stable at such temperatures.

The following specific examples demonstrate the various embodiments of the invention, however, it is to be understood they are for illustrative purposes only, and do not purport to be wholly definitive as to conditions and scope.

EXAMPLE 1

To demonstrate salt splitting of calcium KLG in a three compartment bipolar membrane electrodialysis cell, the following experiment was conducted:

A fermentation broth containing 155 g/l KLG as $Ca(KLG)_2$ was prepared, microfiltered to remove cells, and treated with Dowex Optiporel™ L285 polymeric adsorbent resin to remove color and membrane foulants. Eleven (11) 8 L batches of the broth at pH 5.5 were passed through the feed compartment of a Eurodia 2C three compartment bipolar membrane electrodialysis cell fitted with three (3) sets of Neosepta CMX-SB cation and BP-1 bipolar membranes and FuMA-Tech FAD-PK anion membranes available from The Electrosynthesis Company, Lancaster, N.Y. The cell configuration coincided with that of FIG. 1 of the drawings. The electrodialysis cell unit area was 200 $cm^2$ active area per membrane, and the intermembrane gap was 0.75 mm. The acid compartment was initially filled with 220 g/l KLG acid product from a previous electrodialysis run. The base compartment was filled with a solution containing about 0.5 molar calcium propionate and 4.7 molar propionic acid.

The feed was recycled through the stack and operated at a controlled voltage of 3.7 Volts per cell and at a temperature of 40° C. until about 95% of the KLG was removed. The KLG acid concentration was in the range of 200 to 250 g/l, and the final base composition was 1.3 molar calcium propionate, plus 1.4 molar propionic acid. The total electrodialysis time was 137 hours. The cell was washed with 1 M HCl for 60 minutes, and then with 1 M sodium hydroxide for 15 minutes between batches. The average current density was 35 mA $cm^{-2}$, and the average current density for KLG transport was 65%. The average current density for $Ca^{+2}$ transport was 74%. No calcium deposits were found in the cell on of the experiment.

EXAMPLE 2

To demonstrate salt splitting of calcium lactate in a two compartment bipolar membrane electrodialysis cell, the following experiment is conducted:

A solution of 1 molar calcium lactate in water is passed through the feed compartment of a two compartment bipolar membrane electrodialysis cell stack, such as the Eurodia 2C fitted with three (3) sets of Neosepta CMX-SB cation exchange membranes and BP-1 bipolar membranes. The cell stack corresponds to the configuration according to FIG. 2. The bipolar electrodialysis cell unit area is 200 $cm^2$ active area per membrane, and the inter-membrane gap is 0.75 mm. The base compartment is initially filled with a solution containing 0.5 molar calcium propionate and 4.7 molar propionic acid.

The feed is recycled through the stack and operated at a controlled voltage of 3 Volts per cell and a temperature of 40° C. until about 95% of the calcium lactate is removed. The concentration of the lactic acid product is slightly higher than the feed lactate concentration due to transport of water with calcium, and the: final base composition is approximately 1.3 molar calcium propionate, plus 1.4 molar propionic acid. The average current density is 35 mA $cm^{-2}$, and the average current efficiency for calcium transport is 75%. No calcium deposits are found in the cell after completion of the experiment.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirt and broad scope of the appended claims.

We claim:

1. A method for splitting salts, which comprises the steps of:
   (i) providing an aqueous solution of a salt, said solution comprising cations and anions;
   (ii) separating the cations from said aqueous solution by transporting across a cation exchange membrane;
   (iii) converting the separated cations into the corresponding hydroxide by the introduction of hydroxyl groups supplied across a bipolar membrane;
   (iv) forming a first useful product by acidifying the hydroxide;
   (v) forming a second useful product either by:
      (a) acidifying the anions remaining in said aqueous solution after separating the cations therefrom (step ii) by the addition of protons supplied across a bipolar membrane to form the corresponding free acid of said anion, or
      (b) by separating the anions from said aqueous solution by transporting through an anion exchange membrane, and converting the separated anions to the corresponding free acid by the addition of protons supplied across a bipolar membrane.

2. The method of claim 1 wherein the aqueous solution comprises a metal salt.

3. The method of claim 2 wherein the metal of the metal salt is polyvalent.

4. The method of claim 3 wherein the polyvalent metal of the metal salt is a member selected from the group consisting of $Ca^{+2}$, $Mg^{+2}$, $Al^{+3}$, $Ti^{+3}$ and mixtures thereof.

5. The method of claim 3 wherein the metal salt is derived from a fermentation process.

6. The method of claim 5 wherein the metal salt of the fermentation process is an acid salt.

7. The method of claim 6 wherein the acid salt comprises an anion selected from the group consisting of KLG and lactate, and the useful products formed are selected from the group consisting of KLG free acid, lactic acid and a polyvalent metal salt corresponding to the anion of an acidifying agent employed in Step (iv).

8. The method of claim 6 wherein the salt splitting is conducted in a two or three compartment electrodialysis cell with a bipolar membrane.

9. The method of claim 2 wherein the salt splitting is conducted in a multiple compartment electrodialysis cell stack with a bipolar membrane.

10. The method of claim 2 wherein the acidifying agent is a member selected from the group consisting of inorganic acid, organic acid and mixtures thereof.

11. A method for inhibiting the precipitation of metal hydroxides in salt splitting processes, which comprises the steps of:
   (i) providing an aqueous solution of a salt, said solution comprising a polyvalent inorganic cation and an organic anion;
   (ii) separating the polyvalent inorganic cation from the aqueous solution by transporting across a cation exchange membrane into a base compartment;
   (iii) neutralizing insoluble polyvalent metal hydroxide formed in said base compartment by introducing an acid to said base compartment to form a soluble polyvalent salt product.

12. The method according to claim 11, including the steps of:
   acidifying the anions remaining in said aqueous solution after separating the polyvalent inorganic cations therefrom (step ii) by the addition of protons supplied across a bipolar membrane to form the corresponding free acid of said anions.

13. The method according to claim 12 wherein the aqueous solution of the salt comprises an anion selected from the group consisting of KLG and lactate, and the useful products formed are selected from the group consisting of KLG free acid, lactic acid and a polyvalent metal salt corresponding to the anion of the acidifying agent.

14. The method according to claim 11, including the step of:
   separating the anions from said aqueous solution by transporting across an anion exchange membrane, and converting the separated anions to the corresponding free acid by the introduction of protons supplied across a bipolar membrane.

15. The method according to claim 14 wherein the aqueous solution of the salt comprises an anion selected from the group consisting of KLQ and lactate, and the useful products formed are selected from the group consisting of KLG free acid, lactic acid and a polyvalent metal salt corresponding to the anion of the acidifying agent.

16. The method according to claim 15 conducted in a two or three compartment electrodialysis cell with bipolar membrane.

17. The method according to claim 11 wherein the polyvalent inorganic cation is a polyvalent metal selected from the group consisting of $Ca^{+2}$, $Mg^{+2}$, $Al^{+3}$, $Ti^{+3}$ and mixtures thereof.

18. The method according to claim 11 wherein the acid is a member selected from the group consisting of inorganic acid, organic acid and mixtures thereof.

19. The method according to claim 11 conducted in a multiple compartment electrodialysis cell stack with bipolar membrane.

20. The method according to claim 11 wherein the aqueous solution of the salt is derived from a fermentation process.

* * * * *